(12) United States Patent  (10) Patent No.: US 6,719,366 B2
Lane  (45) Date of Patent: Apr. 13, 2004

(54) RAILROAD PASSENGER SEAT

(76) Inventor: Jon Lane, 1885 Paula La., Des Plaines, IL (US) 60018

( * ) Notice: Subject to any disclaimer, the term of this patent is extended or adjusted under 35 U.S.C. 154(b) by 0 days.

(21) Appl. No.: 10/126,276

(22) Filed: Apr. 19, 2002

(65) Prior Publication Data

US 2002/0153758 A1 Oct. 24, 2002

Related U.S. Application Data

(60) Provisional application No. 60/284,995, filed on Apr. 19, 2001.

(51) Int. Cl.$^7$ .................................................. B60N 2/24
(52) U.S. Cl. ........................ 297/95; 297/101; 297/103
(58) Field of Search ........................... 297/95, 101, 103

(56) References Cited

U.S. PATENT DOCUMENTS

| | | | | |
|---|---|---|---|---|
| 334,957 A | * | 1/1886 | Lemman .................... 297/95 |
| 357,623 A | * | 2/1887 | Pease ........................ 297/95 |
| 364,011 A | * | 5/1887 | Hale .......................... 297/95 |
| 623,256 A | * | 4/1899 | Norcross .................. 297/103 |
| 784,386 A | * | 3/1905 | Curwen ................ 297/103 X |
| 3,479,082 A | * | 11/1969 | Bilancia .................... 297/103 |
| 3,877,746 A | * | 4/1975 | Christine et al. ........... 297/95 |
| 5,076,640 A | * | 12/1991 | Bulte ......................... 297/101 |
| 5,362,124 A | * | 11/1994 | Schlidt ........................ 297/95 |
| 6,179,375 B1 | * | 1/2001 | Lane .......................... 297/103 |

* cited by examiner

Primary Examiner—Peter M. Cuomo
Assistant Examiner—Rodney B. White
(74) Attorney, Agent, or Firm—Edward D. Gilhooly

(57) ABSTRACT

A passenger seat having a walk-over seat back mounted for movement on a pair of rotatable shafts through a pair of of levers mounted on each end of the shafts. The levers contact each other at opposite seat positions to support the seat back. The pair of shafts include a torsion section at each end portion capable of undergoing plastic deformation upon a lock mechanism detecting predetermined deceleration forces. A lever and link element are operatively connected between the seat cushion frame to permit movement. The seat cushion is removable secured to the seat cushion frame.

16 Claims, 5 Drawing Sheets

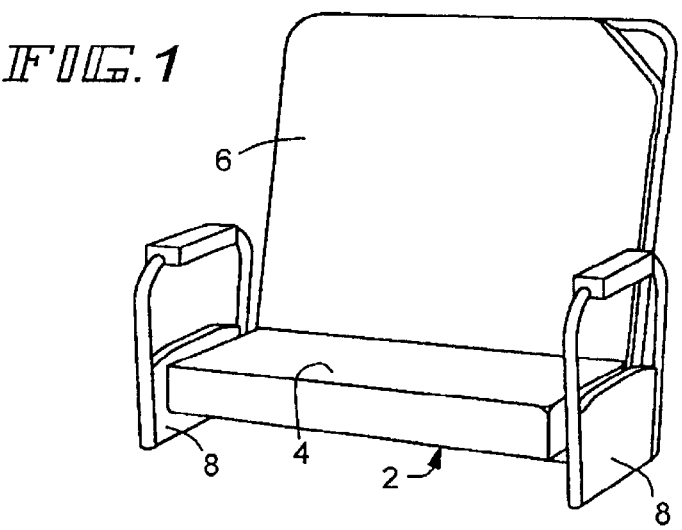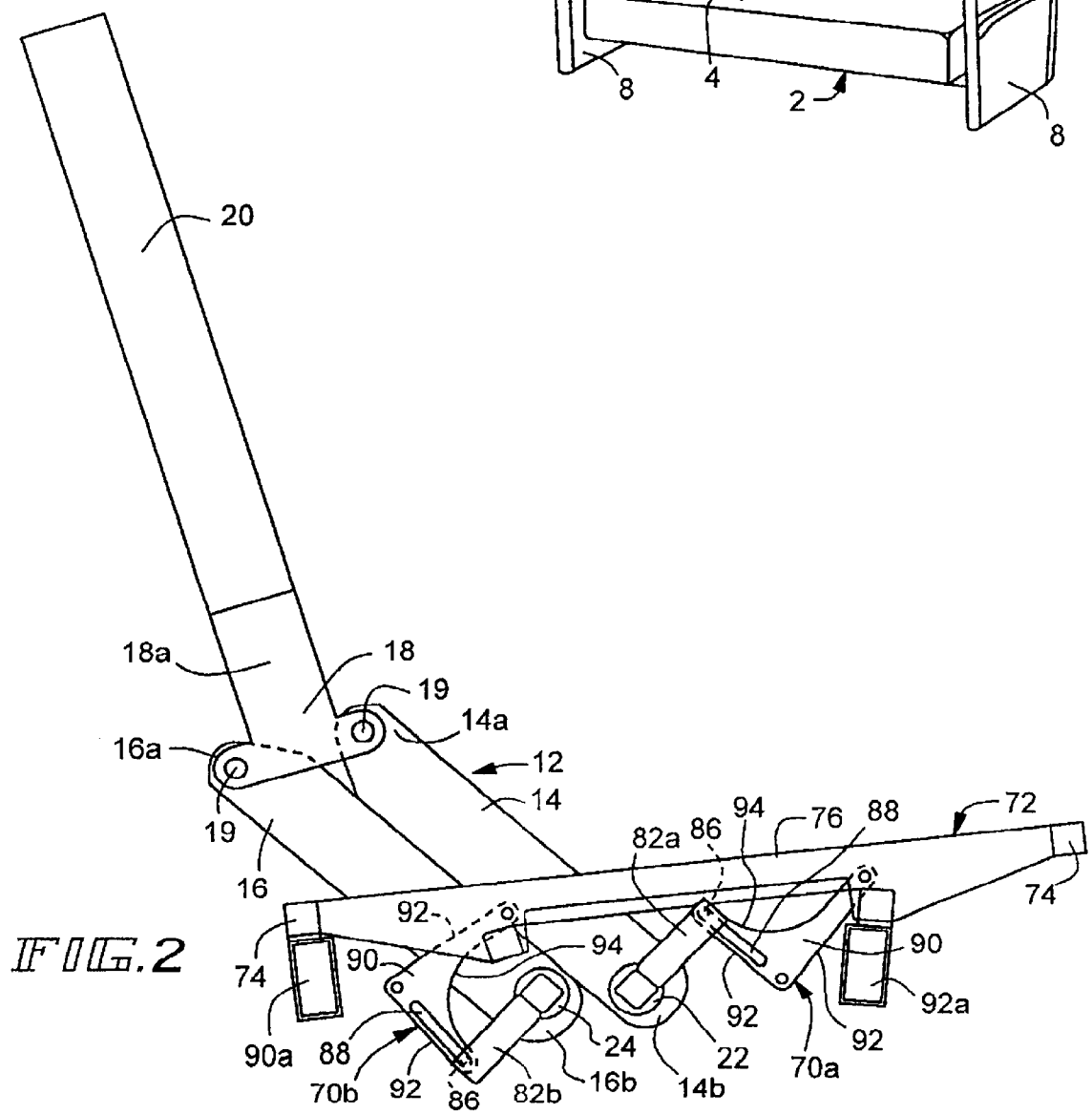

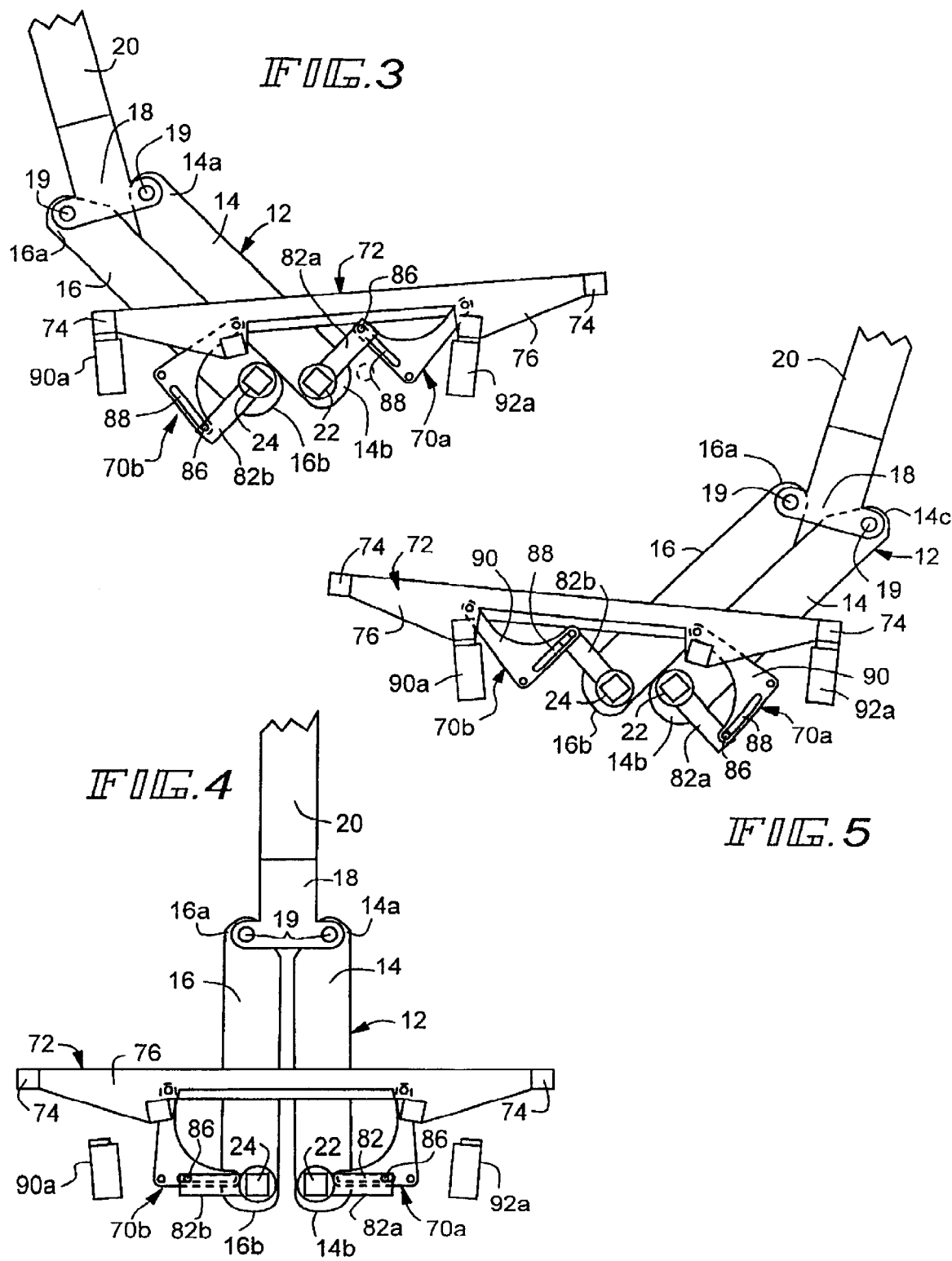

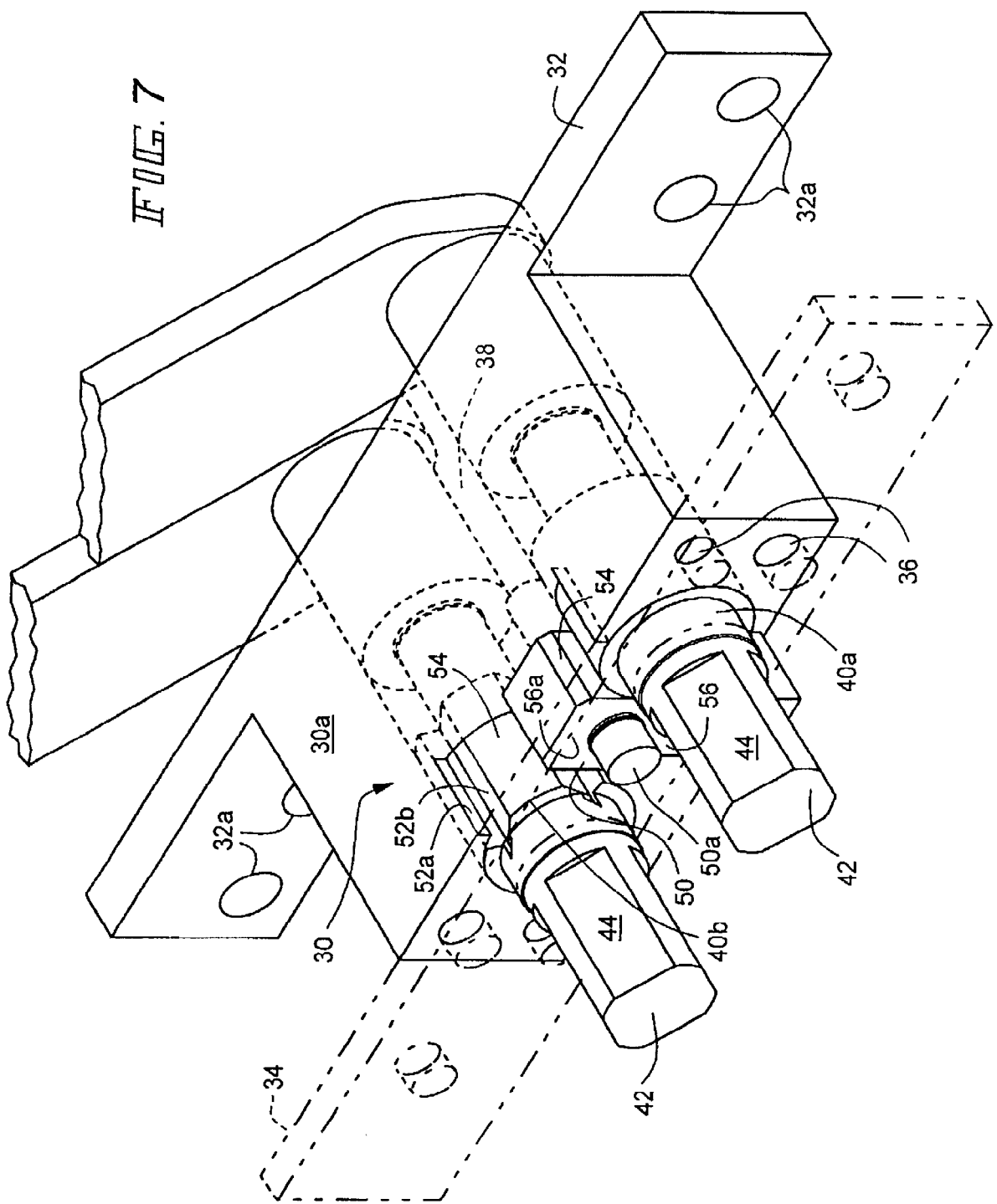

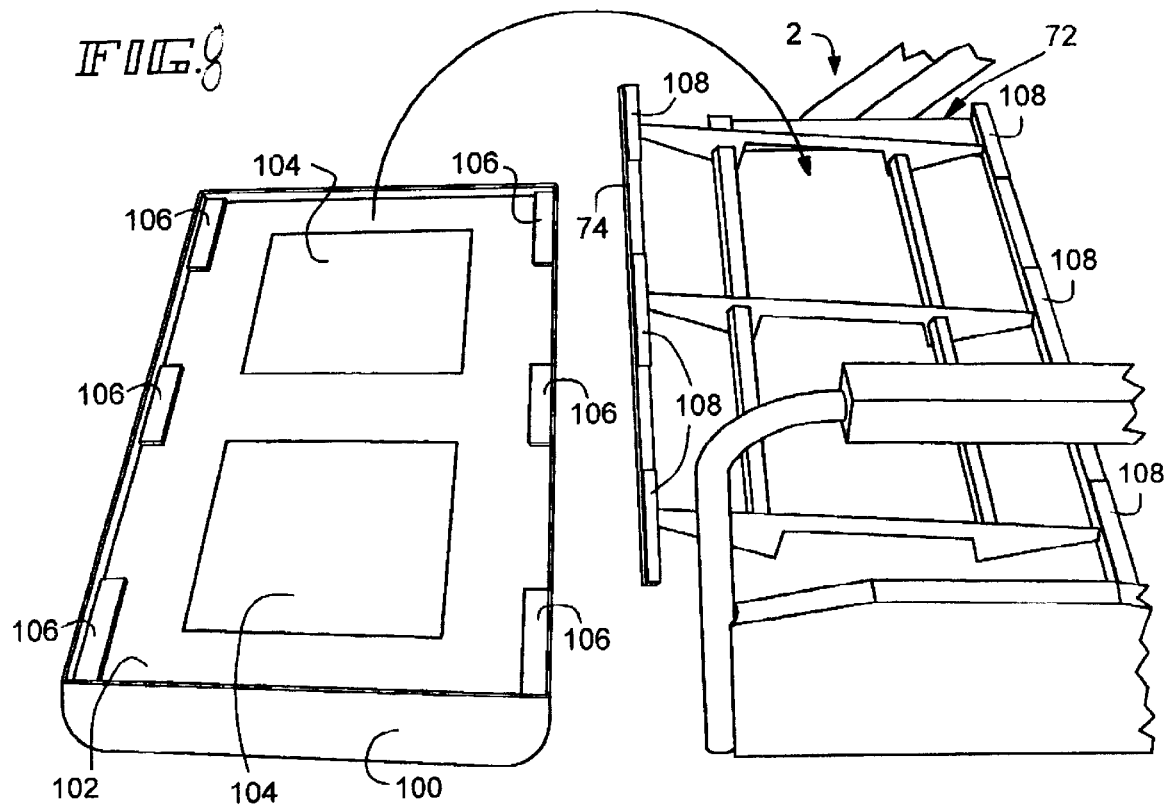

RAILROAD PASSENGER SEAT

This application claims benefit of priority date of provisional application, Ser. No. 60/284,995 filed Apr. 19, 2001.

BACKGROUND OF THE INVENTION

1. Field of the Invention

The invention relates in general to railcars and, in particular, to an improved railroad passenger seat.

2. Summary of the Invention

Numerous designs for railcar passenger seats have been employed over the long history of railroads. A walkover seat is commonly used in current passenger car applications because the seat back position can be moved to oppositely facing directions. Known walkover seats suffer from several problems involving economy of design and manufacture, safety, maintenance and durability. From the safety standpoint, the presence of an unrestrained or restrained seat in front of a passenger creates a hazard during rapid deceleration, such as during a catastrophic emergency. The unrestrained seat offers no protection and causes serious injuries when impacted by a passenger during deceleration. Restrained seats, such as by means of latches and the like, form a rigid obstacle, which likewise causes injury to the passenger impacting the seat back during deceleration. Attempts have been made in the prior art to absorb the energy of impact by a passenger against a seat back, but a need exists in providing effective and economical means of protecting the passenger during emergency situations.

In its opposing positions, the seat back of prior devices utilize latches, stops and support brackets to retain the seat back. Such retention elements are subject to unnecessary wear and require periodic adjustment. Further, the use of brackets and the like to retain the seat back upright does not provide optimum strength characteristics. The seat frames in the past have further used latches or locks to retain it in an operable position. Such latches or locks are subject to stress, which requires repair or replacement. In moving the walkover seat back, the latches can be noisy and are not passenger friendly. The design of seat cushion of prior walkover seats further do not have a frame and cushion design which maximizes the ease of installation by being easily self-positioning. In addition, prior seat cushions do not optimize protection to the cushion by preventing damage from retention clips, vandalism, and normal everyday use. Therefore, it is desirable in the prior art to provide an improved passenger seat overcoming the foregoing and other problems in the prior art.

SUMMARY OF THE INVENTION

It is, therefore, an objective of the invention to provide an improved walkover sat for passenger railcars. The invention hereto provides a seat design of superior strength with a low weight ratio and smooth operative characteristics. The walkover seat of the application is easy to install and service. The cushion frame is designed to rest directly on the seat frame in opposite positions to eliminate the need of latches or locks for retention. By resting on the seat frame, stress on the seat linkages is substantially reduced and a more lightweight linkage assembly can be employed. Such support of the seat cushion frame further provides a stable, quiet, and passenger friendly seat design and is self-positioning.

The seat back of the invention is mounted for movement on a pair of self-positioning levers on each side. In the opposite seat positions, the levers abut each other to retain the seat back in its upright positions. The abutting levers eliminate the need to use support brackets, stops and the like. The abutting levers further provide greater longevity of service, eliminate wear and do not require costly adjustment. The levers also provide excellent strength when stressed to provide a good strength to weight ratio.

The seat cushion of the invention is provided with a unique bottom pan, which protects the seat cushion against damage from installation and use. The cushion pan allows the seat cushion to be dropped onto attachment elements for easy installation and has no exterior protrusions to damage other cushions during transport and use.

The invention herein further is provided with dual locks at opposite ends of the shafts carrying the walkover seat back levers. The dual locks are mounted in end blocks, which also contain energy dissipation shafts. The energy dissipation shafts cooperate with the locks in the blocks to dissipate energy upon the locks restraining rotation of the walkover shafts during extraordinary deceleration conditions of the railcar. The end blocks simplify the elastic components and reduce associated costs and weight.

BRIEF DESCRIPTION OF THE DRAWINGS

FIG. 1 is a front perspective view of a passenger seat employing the improvements of the invention;

FIG. 2 is a partial side elevational view of the seat back frame and linkage assembly of the passenger seat of the invention viewing outward of the seat;

FIG. 3 is a partial side elevational view of seat back frame and linkage assembly of the passenger seat of FIG. 2 showing the seat back in a first seating position;

FIG. 4 is a partial side elevational view of the seat back frame and linkage assembly of FIG. 2 in an intermediate position;

FIG. 5 is a partial side elevational view of the sat back frame and linkage assembly of FIG. 2 in an opposite seating position from FIG. 3;

FIG. 7 is a partial top perspective view of the locking block and torsion shaft of the invention showing the locking element in an unlocked seating position; and FIG. 8 is a side perspective view, with parts exploded, of the cushion frame and cushion of the invention.

DESCRIPTION OF THE PREFERRED EMBODIMENT

Figure 6:
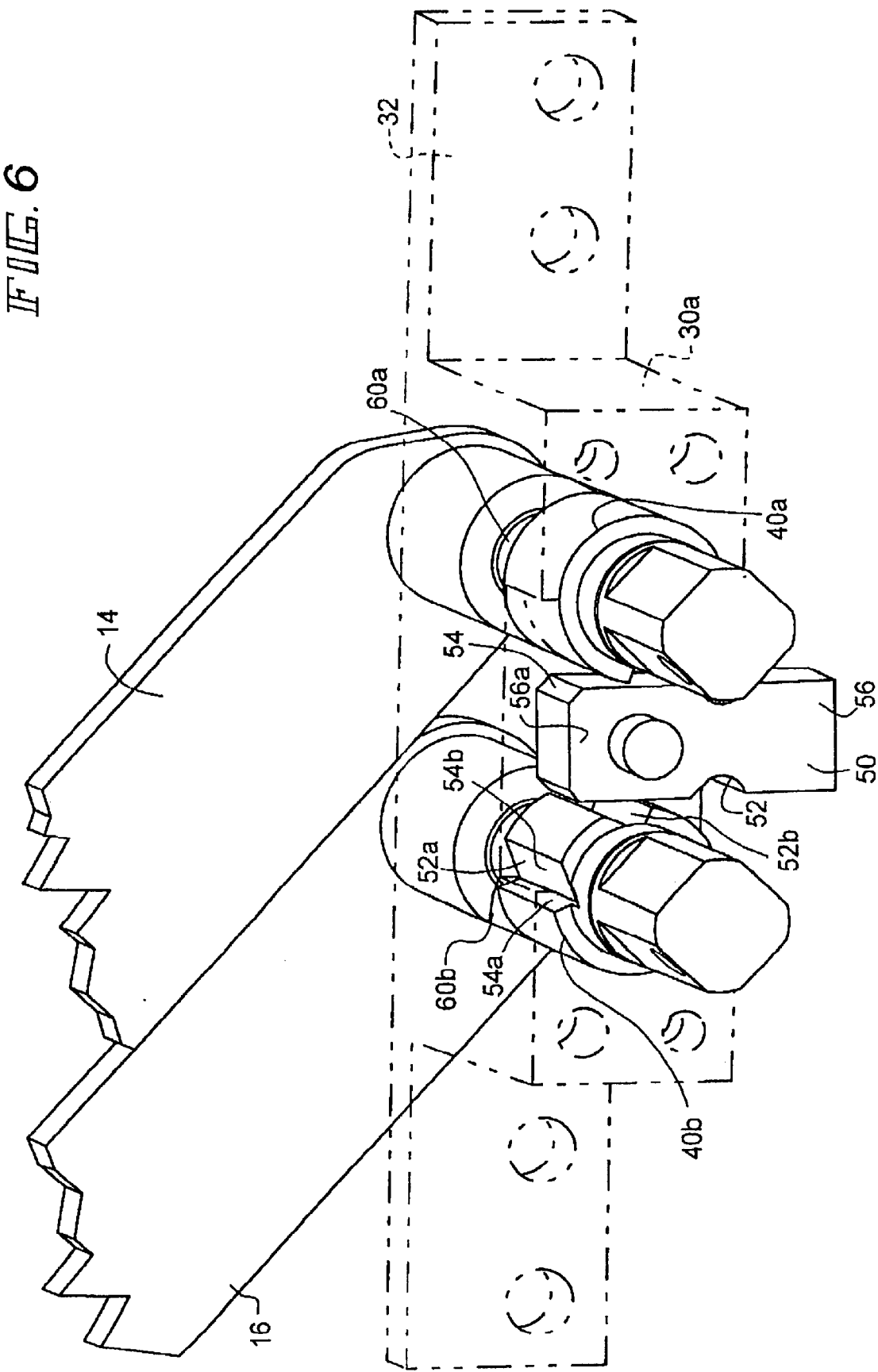
FIG. 6 is a partial end perspective side view, with parts in phantom, of the locking block of the passenger seat of the invention showing the locking element in a locked configuration.

Referring to FIGS. 1 to 10, there is illustrated the improved walkover seat of the invention, generally designated by reference numeral 2. Although the seat 2 is described herein as a walkover seat for passenger railroad cars, it is within the scope of the invention to use the teachings of the invention in any environment in which passenger seats are employed. As is conventional, the passenger walkover seat 2 includes a horizontal seat cushion 4 and a walkover seat back 6 supported on a seat frame 8, which rests on suitable opposed pedestals (not shown). The walkover feature of seat 2 allows the conductor or passenger to move the seat back 6 to opposed positions relative to seat 4 whereby the passengers face in opposite directions.

The walkover capability of passenger walkover seat 2 is best shown in FIGS. 2–4. The seat walkover mechanism 12 is provided with a pair of flat walkover levers 14 and 16. The walkover levers 14 and 16 are interconnected at their upper ends 14*a* and 16*a* by a link 18 pivotally attached to the lever ends by pins 19. A seat back frame member 20 is attached to the upper portion 18*a* of link 18 by a suitable technique to attain walkover movement of seat back frame member 20 on the levers 14 and 16 in conjunction with a pair of horizontal walkover tubes 22 and 24. The walkover tubes 22 and 24 are suitably journaled at both ends on frame 8 and extend through the lower ends of levers 14 and 16 in fixed relationship and under the seat cushion 4 from the aisle side to the window side of passenger seat 2. The opposed positions of the walkover levers 14 and 16 are shown in opposite positions of the seat back 6 in FIGS. 3 and 5. During walkover movement from the position of FIG. 3 to the position of FIG. 5, the walkover tubes 22 and 24 rotate in the same directions to facilitate movement of the entire seat back 6 to the opposed position.

Referring now to FIGS. 6 and 7, a locking block assembly 30 is mounted at each end of hollow walkover shafts 22 and 24 immediately inside of seat back frame levers 14 and 16. The locking block assembly 30 includes a metal block 30*a* having rear integral anchoring plate 32 which is arranged to be secured to frame 8 at both sides by bolt assemblies (not shown) through bolt holes 32*a*. A front plate 34 (FIG. 7) is also secured to block 30*a* by bolts 36 to mount the linkage assembly to be described. The block 30*a* has a cavity 38 to permit solid end extensions 40*a*, 40*b* to be secured to the ends of walkover tubes 22 and 24 and extend through levers 14 and 16 in fixed securement by a conventional technique. The inner ends 42 of the end extensions 40*a*, 40*b* have flattened faces 44 for interfitting in fixed relationship respectively within the ends of hollow walkover shafts 22, 24 having a hollow square cross-sectional configuration.

A locking element 50 is journaled between end extensions shafts 40*a*, 40*b* for pivotal movement on a shaft 50*a* carried on locking block 30*a* as seen in FIGS. 6 and 7. The locking element 50 is generally in the form of a rectangular plate having opposed cutout areas 52 disposed on opposite vertical sides of the locking element 50 and cut-off upper corners 54. The lower portion 56 of locking element 50 extends a greater distance from the shaft 50*a* than upper portion 56*a* to create an imbalance to respond to deceleration and cause pivoting action of the locking element 50 about shaft 50*a* dependent on the direction of the deceleration forces. In a normal vertical orientation of the locking element 50 in absence of any extraordinary forces, the walkover tubes 22, 24 and end extensions 40*a*, 40*b* are free to rotate to change seat back positions. The end extension shafts 40*a* and 40*b* are formed with locking notches 52*a*, 52*b* in the periphery at two positions on each end extension shaft 40*a*, 40*b*. The cutout areas 52*a*, 52*b* are formed by two intersecting faces 54*a*, 54*b* whereby one face 52*a* extends parallel to the axis of rotation of end extensions 40*a*, 40*b*.

In FIG. 6, the locking effect of the locking elements 50 and the cutout areas 52*a*, 52*b* can be seen. In the case of rapid deceleration, the walkover tubes 22, 24 are rotated in opposite directions for a limited degree until the surface of a cutoff corner of the lock element 54*a* engages a portion of the flat face 56*a* of the end extension 40*a*, 40*b* at the same time the locking elements 50 contacts a respective cutout area 52*a*, 52*b* and the upper corner contacts the notches 52*a*, 52*b* of the opposite shaft. The deceleration detected by the locking element 50 is rapid in locking rotation of the walkover shafts 22 and 24 to prevent any further movement of the seat back. After the locking has occurred between the locking element 50 and walkover tubes 22, 24, the energy dissipation sections 60*a*, 60*b* formed by the thinner diameter of the end extensions 40*a*, 40*b* then undergo conditions of plastic deformation by which permanent twisting of the reduced diameter section occurs to the extent necessary to arrest and dissipate the force of the impact. The energy dissipation sections 60*a*, 60*b* can under go up to 90° of permanent deformation under which twisting optimum energy dissipation of the impact force of the passenger with the seat back occurs because the time in dissipating the energy is significantly increased by the plastic deformation.

The levers 14,16 are fixedly retained on the lower ends 14*b*, 16*b* to end portions of walkover tube extensions 40*a*, 40*b*. The pair of levers 14, 16 are mounted at each shaft end in a common vertical plane. In the normal opposed seating positions of the seat backs, the adjacent edges 14', 16' of the levers 16 directly abut each other (FIGS. 2, 3 and 5) to support the seat back with a high strength to strength ratio. Such direct support eliminates the stops and brackets needed in the prior art and provides good strength in the stressed direction. As seen in FIG. 4, the adjacent edges of the levers are spaced from each other in the intermediate position. As seen in FIGS. 2–5, a pair of linkage assemblies 70*a*, 70*b* are further provided in operative relationship between the walkover tubes 22 and 24 and the lower seat cushion frame 72. The cushion frame 72 includes a horizontal pair of elongated edge cross frame members 74 interconnected by end members 76 (FIGS. 8 and 9). A pair of intermediate supports 78 further extend between the end members 76. The pair of linkage assemblies 70*a*, 70*b* move the seat back frame 20 from the position shown in FIG. 3 to the position shown in FIG. 5. In is normal opposed seating portions, the upper surface 80 of the end members 74 are slightly sloped downward from the seat front to the walkover seat back as seen in FIGS. 3 and 5. Each of the linkage assemblies 70*a*, 70*b* are operatively connected to a respective walkover tube 22, 24 by a pair of oppositely facing pivot arms 82*a*, 82*b* which are affixed at one end to tube extensions 40*a*, 40*b*.

The opposite ends of the pair of pivot arms 82*a*, 82*b* include a pin 86 which extends into an elongated slot 88 formed along a straight longitudinal axis in elements 90 of each of the pair of linkage assemblies 70*a*, 70*b*. The link elements 90 are flat members having a modified "L" shape with a pair of straight edge portions 92 and a curved interconnecting portion 94 (FIG. 2). Each link element 90 is pivotally connected to the cushion frame end members 76 at a point adjacent the intersection of the straight edge portions 92 and curved portion 94 of the link elements 90. As the walkover seat back is moved between opposed seating positions, the pin 86 of the lever element 90 moves in the slots 88 in opposite directions of the respective link members. At the upright position during initial movement of the seat back, the respective pins 92 move to opposite ends of the slots 94. As the seat back continues movement to opposite seat positions, the link elements 90 continue pivotal movement and alter the position of the seat cushion frame 72. In the position of seat cushion frame 72 in FIG. 3, the frame member 74 of the seat cushion frame 72 directly rests on cross horizontal member 90*a* of the main seat frame in direct supporting contact along the width of the seat. One of the intermediate frame member 78 of the cushion frame 72 also directly contacts a second horizontal member 92*a* of the main seat frame. For better support both the cushion frame members 74 and main frame members 90*a*, 92*b* advantageously possess a square configuration. Such direct contact between the cushion frame 72 and main frame cross members 90*a*, 92*b* provides maximum support of the seat cushion frame and seat back without latches or locks.

When walkover seat 2 is moved to the seating position of FIG. 5, the opposite cushion cross frame 74 directly contacts the main seat cross frame 92a. The second intermediate cross frame 78 rests on the opposite seat main frame 90a in FIG. 5. At the seat back position of FIG. 3, the lever arms 82a, 82b are disposed along generally parallel planes with the lever arms 82a, 82b directed upward and the free end of the lever arm 82b is directed downward. In the seat back position of FIG. 5, the pin end of the pivot arms 82a is directed downward and the pin end of the pivot arm 82b is directed upward in generally parallel relationship. In the intermediate position of FIG. 5, the pin ends of lever arms 82a, 82b are generally directed in opposite directions along the same horizontal axis.

Referring to FIG. 10, there is illustrated the bottom of a seat cushion 100 prior to attachment to the seat cushion frame 72. The bottom of seat cushion 100 includes a pan 102 in the form of a metal or plastic that covers the bottom of the seat cushion 100 for protection. The pan 102 includes a pair of rectangular openings 104 and is secured to the seat cushion by mechanical fasteners (not shown). A series of strips 106 of hooks or loops of material, such as sold under the trademark VELCRO hooks are secured along the front and rear portions of the pan 102. Complimentary strips 108 of loops, which adhere to strips 106, are secured by an adhesive to cushion frame members 74, whereby the cushion 100 is simply installed by being placed on the seat cushion frame 72 with strips 106 and 108 in contact. Such a securement capability results in immediate self positioning of the cushion on the seat frame and permits ready removal of the cushion 100 for repair and replacement.

What is claimed is:

1. A passenger seat comprising
a main seat frame having a plurality spaced of horizontal cross members,
a seat cushion frame arranged to be operatively affixed to said main frame and having a seat back frame mounted for movement between a first position and second position,
said seat cushion frame further having a plurality of spaced horizontal cross frame members,
said seat cushion frame being coupled for movement with said seat back frame between said first position and said second position,
one of said plurality of cross frame members resting on one of said plurality of cross frame members in said first position of said seat frame,
said plurality of spaced horizontal cross members comprises a pair of spaced horizontal cross members,
said plurality of spaced cross members of said seat cushion frame comprises a pair of end cross members and at least one horizontal intermediate member extending in parallel relationship between said end cross members, and
one of said pair of end cross members of said seat cushion frame resting on one of said pair of cross member of said main frame and said at least one intermediate cross member of said seat cushion frame resting on said second of said pair of end cross members in said first position of said seat cushion frame.

2. The passenger seat assembly according to claim 1 wherein another one of said plurality of said cross members of said seat cushion frame rests directly on another one of said plurality of cross members of said main seat frame in said first position of said seat back frame.

3. The passenger seat assembly according to claim 1 wherein the second of said pair of end cross members of said seat cushion frame rests on the other of said pair of cross members of said main frame in said second position of said seat back frame.

4. The passenger seat assembly according to claim 3 wherein said at least one intermediate cross member of said seat cushion frame contacts said one of said pair of end cross members of said main seat frame in said second position of said seat back frame.

5. The passenger seat assembly according to claim 3 wherein said at least one intermediate cross member of said seat cushion frame contacts said one of said pair of end cross members of said main seat frame in said second position of said seat back frame.

6. A passenger seat comprising
a moveable seat cushion frame having lower frame members,
said seat cushion frame being supported on seat frame having upper support surfaces, and
said lower frame members of said seat cushion frame directly resting on said upper support surfaces,
said seat cushion frame includes a seat back frame moveable between first and second seating positions, and
said seat cushion frame is supported on a pair of adjacent levers having a predetermined length, said levers being pivotally attached to said seat frame, and said levers abutting each other substantially along said predetermining length in each of said first and second seating positions for supporting said seat cushion frame.

7. The passenger seat according to claim 6 wherein said seat cushion frame includes at generally a horizontal pair of said lower frame members, said pair of lower frame members having lower surfaces for contacting said upper support surfaces.

8. The passenger seat according to claim 6 wherein said upper support surfaces are formed by a pair of spaced cross members of said main seat frame.

9. A passenger seat comprising a moveable seat cushion frame having lower frame members,
said seat cushion frame being supported on said seat frame having upper support surfaces, and
said lower frame members of said seat cushion frame directly resting on said upper support surfaces,
said seat cushion frame includes a seat back frame moveable between first and second seating positions,
said seat cushion frame is supported on a pair of adjacent levers, said levers being pivotally attached to said seat frame, and said levers abutting each other in each of said first and second seating positions for supporting said seat cushion frame,
said seat cushion frame includes a generally horizontal pair of said lower frame members, said pair of lower frame members having lower surfaces for contacting said upper support surfaces,
said seat frame includes a pair of spaced frame members extending the width of said seat cushion frame and a pair of intermediate frame members extending the width of said seat cushion frame at a position between said pair of spaced frame members, one of said pair of frame members and one of said pair of intermediate frame members respectively resting on said support surfaces of said spaced cross members of said main seat frame in said first seating position.

10. The passenger seat according to claim 9 wherein said other of pair of said spaced frame members and the other of pair of said intermediate frame members respectively rest on said support surface of said pair of cross members in said second seating position.

11. A passenger seat comprising
   a seat frame having a pair of opposite ends,
   a seat back,
   a plurality of shafts extending generally between opposite ends of said seat frame, said plurality of shafts terminating with end portions extending beyond said seat frame at each of said pair of opposite ends,
   said plurality of shafts mounting said seat back for movement to oppositely facing positions of said seat back,
   energy dissipation means being positioned on each end of said end portions of said plurality of shafts, and
   said energy dissipation means being formed on each of said end portions of said plurality of shafts,
   said energy dissipation means includes locking means for arresting movement of said plurality of shafts in response to deceleration forces,
   said energy dissipation means further includes a narrowed shaft section formed at each of said pair of end portions of said plurality of shafts, said narrowed shaft section being capable of undergoing plastic deformation in response to deceleration forces to dissipate energy.

12. The passenger seat according to claim 11 wherein said locking means and said narrowed shaft sections of said pair of plurality of end portions are respectively positioned with a hollow block.

13. A passenger seat comprising,
   a seat frame having a pair of opposite ends,
   a seat cushion frame and seat back being operatively connected to said seat frame,
   at least one rotatably mounted shaft extending between opposite ends of said seat frame and being operatively connected to said seat back to permit movement of said seat back between a first seating position and a second seating position in response to rotation of said at least one shaft,
   lever means being fixedly connected to said at least one shaft and said seat cushion frame and being moveable in response to said movement of said seat back, and
   said lever means includes a lever arm attached to said at least one shaft at each end and a link element operatively attached between said lever arm and said cushion frame, said lever arm and said link element undergoing movement in response to rotation of said at least one shaft to move said cushion frame,
   said link element being pivotally attached to said seat frame, and
   said lever arm includes a pin at one end, said link element having a slot formed along a generally straight longitudinal axis for receiving said pin, said pin being moveable in said slot during rotation of said at least one shaft.

14. The passenger seat according to claim 13 wherein said at least one shaft includes a pair of rotatably mounted shafts, said lever means having a lever arm mounted at each end of said pair of shafts and a respective link element operatively operative connected to said lever means and said seat cushion frame.

15. The passenger seat according to claim 14 further including a pair of levers fixedly attached respectively to said pair of shafts at each end and being attached to said seat bask, said pair of levers contacting each other at said first seating position and said section position of said seat back.

16. A passenger seat comprising
   a seat cushion having a bottom member forming flat lower surfaces,
   a cushion frame having a plurality of frame members forming upper surfaces,
   said flat lower surfaces and said flat upper surfaces arranged to contact each other, at least a portion of said flat lower surfaces and said flat upper surfaces having respective hook securement elements and interconnecting loop securement elements for removaby securing said seat cushion to of said cushion frame,
   said bottom member being a seat pan forming said lower surface, and
   said strips of respective hook securement elements and interconnecting loop elements being attached to said lower surface.

* * * * *